United States Patent [19]

Reynolds et al.

[11] Patent Number: 5,022,424

[45] Date of Patent: Jun. 11, 1991

[54] TENSION LOADED COMPOSITE RUPTURE DISK

[75] Inventors: John W. Reynolds, Bixby; Bobby H. Burton; Jerry W. Kays, both of Tulsa, Okla.

[73] Assignee: Oklahoma Safety Equipment Co., Broken Arrow, Okla.

[21] Appl. No.: 591,565

[22] Filed: Oct. 2, 1990

[51] Int. Cl.⁵ ............................................. F16K 17/40
[52] U.S. Cl. ................................. 137/68.1; 220/89.1
[58] Field of Search ................ 137/67, 68.1; 220/89.1

[56] References Cited

U.S. PATENT DOCUMENTS 3,704,807  12/1972  Lidgurd ........................ 137/68.1 X
4,278,181   7/1981  Wood et al. ................... 137/68.1 X Primary Examiner—John C. Fox
Attorney, Agent, or Firm—Pravel, Gambrell, Hewitt, Kimball & Krieger

[57] ABSTRACT

A composite rupture disk includes a slit-slot, tension loaded disk having a plurality of circumferentially spaced radial slits (e.g. six in number) that terminate before reaching the disk center, thereby defining an uncut disk central portion which can be sized to at least partially influence the disk burst pressure. A radial strap, spot welded at each end attaches respectively at its end to the disk central portion and to the disk periphery, thereby preventing a downstream flow of the central portion upon rupture.

10 Claims, 2 Drawing Sheets

TENSION LOADED COMPOSITE RUPTURE DISK

BACKGROUND OF THE INVENTION

1. Field of the Invention

The present invention relates to rupture disks that prevent over pressure damaging of vessels, and more particularly relates to an improved composite tension loaded rupture disk that includes a multi-slit, multi-petal disk having an uncut central portion that can be sized to define the disk burst pressure, and wherein a radial strap extends between the central portion of the disk and the disk periphery so that upon rupture, the strap holds the central portion to the remainder of the disk, preventing its flow downstream with the flow that passes through the burst disk.

2. General Background

Rupture disks are commercially available structures that can be placed in a flow line, or on a vessel for defining a desired maximum pressure for the vessel, defined as a "burst pressure", so that the disk rather than the vessel will explode upon the burst pressure being reached.

Early examples of a rupture disk can be seen in the Wood U.S. Pat. No. 3,091,359 and in the Raidl U.S. Pat. No. 3,722,734.

Other patents have been issued that relate to various rupture disk constructions. The Shaw et al U.S. Pat. No. 3,881,629 entitled "Self Aligning Rupture Disk" provides a safety pressure relief device of the rupturable disk type wherein a unitary assembly is provided with a vacuum support disk being retained in a mounting ring having an outer flange portion secured to the rupture disk and an inner sleeve portion extending axially of the flange portion and away from the rupture disk. A ledge projects inwardly from the sleeve portion forming therewith a depressed seat for receiving the support disk. The exterior of the sleeve is received into the mounting flange or inlet holder providing alignment therein for assembly. A pressure relief disk has a plurality of radially spaced slits that communicate respectfully into and extend radially outward from each of a plurality of openings, and terminate on a diameter less than the damage of the mounting ring so that the length of the slits partially determines the rupture pressure of a disk. U.S. Pat. No. 3,881,629 is incorporated herein by reference. Another patent that relates to a safety pressure relief device consisting of a perforated rupture disk, a sealing element and a vacuum support can be seen for example in U.S. Pat. No. 2,954,897.

U.S. Pat. No. 4,079,854 entitled "Rupture Disc Pressure Relief Device" is the subject of a safety pressure relief assembly of the rupture disc type that guards against pressure differentials beyond a predetermined range extending both above and below zero, and includes a positive relief disc which is perforated to permit negative flow without rupturing. A sealing disc normally blocks the perforations, and a cutting member is positioned in spaced relation to the sealing disc, and extending a substantial transverse distance thereacross and a sealing disc support member having a stay arrangement projects into negative supporting engagement with the sealing disc. The stay arrangement has a resistance to collapse sufficient to retain the sealing disc out of contact with the cutting member only up to a predetermined negative pressure. The subcombination of sealing disc, stay arrangement and cutting member is separately useful, especially as a very low pressure relief device.

U.S. Pat. No. 4,119,236 entitled "Low Pressure Rupture Device" shows a safety pressure relief assembly of the reverse acting rupture disc type that guards against very low pressure differentials and includes a thin, bulged sealing disc, a cutting member positioned in spaced relation to the sealing disc and extending a substantial transverse distance thereacross and a sealing disc support member having a stay arrangement projecting into supporting engagement with the concave side of the sealing disc.

U.S. Pat. No. 4,278,181 entitled "Safety Pressure Relief Device" is the subject of a safety pressure relief device provided for the venting of fluid pressure between first and second pressure zones. The relief device includes a first rupture disk having a flexible sealing membrane located on one side thereof, and a knife means located on the other side of the first rupture disk. The first rupture disk includes a plurality of arcuate slots circumscribing a substantially circular blowout portion. The knife includes a circular cutting blade located radially inward of the arcuate slots. Upon rupture of the first rupture disk, due to excess pressure in the second pressure zone, the substantially circular blowout portion passes through a circular opening in the knife means, allowing the flexible sealing membrane to contact the cutting blade and be severed thereby. Alternative embodiments add a second rupture disk to relieve excess fluid pressure from the first pressure zone to the second pressure zone.

U.S. Pat. No. 4,289,327 entitled "Air Bag Device For Cars" shows a mechanical bag device for cars wherein a frangible lid seals a container having a gas under pressure therein. The frangible lid is supported by a pressing lid in contact with a link mechanism. During a crash, an impact detecting assembly releases the link mechanism which in turn releases the pressing lid which permits the frangible lid to be fractured by the high pressure gas to inflate the bag.

U.S. Pat. No. 4,301,938 entitled "Safety Pressure Relief Device" is the subject of a safety pressure relief device provided for venting of fluid pressure between first and second pressure zones. The relief device includes a first rupture disk having flexible sealing membrane located on one side thereof, and a knife means located on the other side of the first rupture disk. The first rupture disk includes a plurality of arcuate slots circumscribing a substantially circular blowout portion. The knife means includes a circular cutting blade located radially inward of the arcuate slots. Upon rupture of the first rupture disk, due to excess pressure in the second pressure zone, the substantially circular blowout portion passes through a circular opening in the knife means, allowing the flexible sealing membrane to contact the cutting blade and be severed thereby. Alternative embodiments add a second rupture disk to relieve excess fluid pressure from the first pressure zone to the second pressure zone.

U.S. Pat. No. 4,434,905 is the subject of a "Rupturable Low Pressure Relief Apparatus" adapted to be clamped between conventional pipe flanges or annular support members. The disk is composite, basically comprised of a first circular rupturable member formed of solid flexible material and a second circular rupturable member also formed of flexible material positioned adjacent the first rupturable member. The second rupturable member includes a solid annular flange portion and a plurality of arcuate slots circumscribing a substantially circular central portion with rupture tabs between the arcuate slots. Knife means having a cutting edge forming at least a portion of a circle are positioned adjacent the second rupturable member so that when the second rupturable member ruptures, the first rupturable member is severed by the knife means. Alternate embodiments add additional rupturable members and knife means to cause the apparatus to rupture in either direction at low pressure differentials.

U.S. Pat. No. 4,498,261 entitled "Low Pressure Venting Panel" shows a low pressure venting panel that acts to safely vent a pressure vessel, such as a bag house, from overpressure conditions. The venting panel is particularly responsive and predictable at low pressures. The panel includes a thin rupture body with a central group of apertures and slit lines emanating from the apertures. A thin sealing membrane is bonded to one surface of the rupture body at least in the area of the slits. The characteristics of the sealing membrane enable the membrane to resist expansion in the area of the slits when pressure is applied to the rupture body, thereby resisting rupture of the membrane up to the design rupture limit of the venting panel.

U.S. Pat. No. 4,505,180 entitled "High Reverse Pressure Resistant Low Forward Burst Pressure Rupture Disc Assembly" is the subject of a rupture disc assembly having the seemingly inconsistent properties of resisting relatively high burst pressures in one direction, while rupturing upon experiencing relatively low pressures in the opposed direction. The assembly includes a metallic, frangible disc having a low pressure face and an opposed, scored high pressure face, along with an apertured backing member positioned adjacent the low pressure face; the backing member includes webs aligned with the disc scoring which engage the low pressure face and prevent disc rupture under the influence of high burst pressures directed against the remote high pressure face, while permitting disc rupture when the relatively low burst pressures are developed adjacent the low pressure face. The burst regions of the disc preferably include concave-convex portions, with the convex faces thereof forming a part of the low pressure face and extending into corresponding openings through the adjacent backing member. The assembly finds particular utility in projectiles fired from hand held weapons, in order to sequence and divide the recoil forces developed when the weapon is fired to thus protect the user from injurious recoil forces.

U.S. Pat. No. 4,512,491 entitled "Dual Range Rupture Disc Assembly" is the subject of a two directional rupture disc assembly which serves in a fluid reactor system as a safety relief valve when a critical condition, such as predetermined pressure positive or negative, is encountered. That is, the rupture disc assembly hereof is operatively coupled to a reactor vessel and allows fluid flow in one direction when one reactor system condition is encountered and allows fluid flow in an opposite direction when another reactor system condition is encountered. Under normal conditions, the reactor system operates in a certain pressure range with the assembly hereof inflow blocking disposition, but if a reactor condition outside of the normal operating range is encountered, the assembly ruptures to permit fluid flow in the appropriate direction. Preferably, the rupture disc assembly includes a pair of flat rupture discs and an imperforate membrane between the two discs. Each disc includes an innermost and outermost C-shaped pattern formed by a plurality of serially arranged slots through the respective disc. The discs and membrane are mounted and the patterns manufactured such that the discs rupture adjacent the outermost pattern when one condition is encountered and the discs rupture adjacent the innermost pattern when another condition is encountered.

U.S. Pat. No. 4,597,505 entitled "Rupture Disc With Selectively Positioned Initial Buckling" discloses a rupture disc system that comprises a rupture disc including a dome portion and a flange portion interconnected by a transition region, and a mounting mechanism for mounting the rupture disc by the flange portion thereof in a pressure relieving vent. The rupture disc includes a thickness reducing groove at least partially circumferentially surrounding the dome portion and located in the transition region thereof. The rupture disc is of the reverse buckling type and the groove does not completely surround the dome portion so as to define a tab or hinge within that part of the transition region which is ungrooved or not as deeply grooved as a remainder of the transition region. The system includes a support structure for the disc which supports the transition region except in a sector adjacent the dome portion where initial failure is desired. The location of the unsupported sector is approximately centered relative to the tab or hinge. In addition, the disc support structure preferably comprises a downstream ring member having an arcuate projection which extends into the vent. The arcuate projection is located so as to be relatively close to and so as to align with the tab or hinge such that the dome portion wraps about the projection when reverse buckling and rupture occurs.

U.S. Pat. No. 4,612,739 entitled "Low Pressure Venting Panel" describes a low pressure venting panel acts to safely vent a pressure vessel, such as a bag house, from over pressure conditions. The venting panel is particularly responsive and predictable at low pressures. The panel includes a thin rupture body with a central group of apertures and slit lines emanating from the apertures. A thin sealing membrane is bonded to one surface of the rupture body at least in the area of the slits. The characteristics of the sealing membrane enable the membrane to resist expansion in the area of the slits when pressure is applied to the rupture body, thereby resisting rupture of the membrane up to the design rupture limit of the venting panel. Various aperture patterns in the center of the rupture body are provided to facilitate predictable opening. The slits are divided into segments connected by bridges to help prevent the slits from separating and the sealing membrane from creeping through the slits prior to rupture. Protective strips adjacent the slits are positioned between the rupture body and the sealing membrane to reduce creep of the membrane through the slits prior to rupture. A vacuum acting thereon opposite the rupture body.

U.S. Pat. No. 4,655,070 issued to Miner Clift and entitled "Scored Concave-Convex Rupture Disk and Method of Manufacture" relates to an improved method of forming reverse buckling type rupture disks.

U.S. Pat. No. 4,657,157 entitled "Pressure Relief Method And Rupture Disk Assembly" relates to a method and assembly for relieving positive and/or negative pressure differentials between first and second fluid pressure zones. The rupture disk assembly is comprised of a flexible sealing member, a retainer means positioned on one side of the sealing member for engagement with and retention of the sealing member until disengaged therefrom when a predetermined negative pressure differential is exerted across the sealing member, and knife means for severing the sealing member spaced therefrom whereby the sealing member is prevented from contacting the knife means until disengaged from the retainer means.

U.S. Pat. No. 4,662,126 entitled "Vibration Resistant Explosion Control Vent" shows a burst panel assembly for normally covering a vent opening of a structure which defines an area to be protected from the buildup of dangerously high internal pressures and has two frangible panels disposed in spaced, fact-to-face relationship along with a core of expanded polyurethane foam which functions to dampen vibrations received from the structure and transmitted to the frangible panels. The foam is introduced in an initially flowable condition into the space between the panels and thereafter expands while curing to a solidified configuration for continuously exerting pressure both of the panels, to thereby substantially reduce the fatigue stress that would otherwise occur along lines of weakness of burst patterns that are formed in both of the panels. In a preferred method of construction of the burst panel assembly, pressurized air is initially introduced into the space between the panels to shift one of the panels outwardly to a pre-bulged configuration, and subsequently a negative pressure is applied to the outside face of the opposite panel to shift the same in an outward direction while filling the space with the initially flowable foam material, so that the foam expands to a configuration larger than would be otherwise possible and is subsequently "pre-stressed" against the same panel when the negative pressure is relieved. The foam material when cured strengthens the assembly by providing support to the central portions of the frangible panels, and also the foam is compressible and somewhat resilient so that vibrations transmitted to the frangible panels are effectively dampened. The burst panel assembly is particularly useful for protecting relatively low pressure equipment such as bag houses, dust collectors and dryers.

U.S. Pat. No. 4,669,626 entitled "Rupture Disc With Selectively Positioned Initial Buckling" provides a disc system comprising a rupture disc including a dome portion and a flange portion interconnected by a transition region and a mounting mechanism for mounting the rupture disc by the flange portion thereof in a pressure relieving vent. The rupture disc includes a thickness reducing groove at least partially circumferentially surrounding the dome portion and located in the transition region thereof. Preferably, the rupture disc is of the reverse buckling type and the groove does not completely surround the dome portion so as to define a tab or hinge within that part of the transition region which is ungrooved or not as deeply grooved as a remainder of the transition region. In addition, the slope or radius of curvature may be increased in the region of the tab. The rupture disc also includes an indentation on the dome portion. The indentation is preferably greatest on the dome portion at a location spaced from the transition region and directly between the tab and a crown of the dome portion. In addition, the mounting mechanism includes a lower ring member having an arcuate projection which extends into the vent. Preferably, the arcuate projection is located so as to be relatively close to and so as to align with the tab such that the dome portion wraps about the projection when reverse buckling and rupture occurs. Methods are disclosed for producing the disc with the groove and the indentation. U.S. Pat. No. 4,759,460 entitled "Rupture Disc System" shows a rupture disc system that includes a rupture disc a dome portion and a flange portion interconnected by a transition region and a mounting mechanism for mounting the rupture disc by the flange portion thereof in a pressure relieving vent. The rupture disc includes thickness reducing groove at least partially circumferentially surrounding the dome portion and located in the transition region thereof. Preferably, the rupture disc is of the reverse buckling type and the groove does not completely surround the dome portion so as to define a tab or hinge within that part of the transition region which is ungrooved or not as deeply grooved as a remainder of the transition region. In addition, the slope or radius of curvature may be increased in the region of the tab. The rupture disc also includes an indentation on the dome portion. The indentation is preferably greatest on the dome portion at a location spaced from the transition region and directly between the tab and a crown of the dome portion. In addition, the mounting mechanism includes a lower ring member having an arcuate projection which extends into the vent. Preferably, the arcuate projection is located so as to be relatively close to and so as to align with the tab such that the dome portion wraps about the projection when reverse buckling and rupture occurs. Methods are disclosed for producing the disc with the groove and the indentation.

U.S. Pat. No. 4,777,974 entitled "Staged Pressure Relief Assembly" is the subject of a pressure relief panel assembly for rupture discs, explosion vents and the like that includes a plurality of frangible panel portions which burst at different pressures to present a pressure relieving aperture having a cross-sectional area which varies in accordance with the number of panel portions which have ruptured. In one embodiment of the invention, the assembly comprises two frangible panels positioned in face-to-face relationship in covering disposition to a vent opening, and the innermost panel has an orifice which functions as a pressure relieving aperture once the outermost panel ruptures; subsequently, further build up of pressure causes the innermost panel to burst and present a pressure relieving aperture larger that the orifice so that the structure to be protected is fully vented. In certain forms of the invention, a discontinuous pattern of perforated lines of weakness in the innermost panel serve as pressure relieving apertures once the outermost panel ruptures. In another embodiment, the assembly comprises a single panel having one set of weakness lines defining a first frangible panel portion and a second set of weakness lines surrounding the first set and defining a second frangible panel portion.

U.S. Pat. No. 4,795,051 entitled "Rupturable Fluid Pressure Relief Apparatus And Manufacturing Method" discloses a rupturable fluid pressure relief apparatus and method of manufacturing such apparatus capable of rupturing in either the normal or reverse rupture modes at predetermined rupture pressures. The apparatus includes a circular rupture disk positioned between a pair of annular rupture pressure control members. The rupture pressure control members include centrally positioned circular openings therein of sizes such that the rupture disk ruptures at predetermined rupture pressures or pressure differentials exerted from either side of the rupture disk.

U.S. Pat. No. 4,809,729 entitled "Pressure Relief Device" provides an improvement in a safety pressure relief device adapted to be installed between a standard base flange and a standard hold-down flange including a first crowned rupture member, a second crowned rupture member, a resilient sealing membrane, the resilient sealing membrane being positioned between the first crowned member and the second crowned member, the first crowned member being positioned with respect to the second crowned member with its convex side away from the second crowned member, the convex side of the second crowned member being away from the first crowned member, both the first and second crowned members being perforated to allow pressure fluids to pass therethrough to be exerted against the sealing member, and means securing the first crowned rupture member and the second crowned rupture member to the resilient sealing member. The improvement of this patent is directed to the resilient sealing membrane forming a plane of symmetry between the first and second crowned rupture members; each of the first and second crowned rupture members being provided with a flat outer lip; and upper and a lower upstanding collar, each collar terminating in an outer lateral flat flange portion; and the outer lateral flat flange portions of the collars, the flat outer lips of the crowned rupture members and the outer periphery of the resilient sealing membrane being permanently fastened together. In this way, the relief valve assembly is capable of being installed in either direction between the base flange and the hold-down flange. U.S. Pat. No. 4,819,823 entitled "Safety Pressure Relief Device And Method For Making The Same" shows a vacuum support for use with a safety pressure relief rupture member. A vacuum support disk includes a convex side and a concave side with the convex side being positioned against a concave side of the rupture disk which also includes convex and concave sides. A arc-shaped slit, centered with respect to the vacuum support disk, is formed therethrough and permits fluid communication between either side of the vacuum support disk. A pair of opposed substantially parallel disk edges define opposite sides of the slit. The edges are urged against one another when the pressure on the concave side of the vacuum support disk is lower than the pressure on the convex side of the rupture disk thereby supporting the rupture disk.

GENERAL DISCUSSION OF THE PRESENT INVENTION

One of the problems of fragmenting type tension loaded rupture disks is that the uncut central portion of the disk often breaks cleanly away from the surrounding petals and flow downstream. This downstream flow of metal particles is undesirable because of potential damage to equipment, to ongoing processes and/or to flow lines.

The present invention solves these prior art problems and shortcomings in a simple straightforward manner by providing an improved composite rupture disk construction wherein the uncut central portion of the disk, defined by a plurality of slots which approach but terminate at the center of the disk, is maintained as connected to the remainder of the disk after bursting or rupture by a fastener or strap which extends between the periphery of the disk and the uncut central portion. The strap holds the annular uncut central portion of the disk after bursting by forming a tensile connection between the central portion of the disk and the disk periphery. In the preferred embodiment, the strap is an elongated metal fastener which is spot welded at each of its end portions respectfully to the disk periphery and to the central uncut portion of the disk.

The present invention provides an improved composite rupture disk construction having an annular top disk section with a central portion and a plurality of circumferentially spaced radial slits or cuts, each terminating a distance from the central portion leaving a generally circular uncut center having a size that can determine at least in part the burst pressure of the disk apparatus. The slits form therebetween a plurality of pie shaped disk petals that can separate upon rupture. These petals have typically very sharp edges.

An uncut annular bottom disk seal member is provided which abuts and is correspondingly sized to fit in a face-to-face relationship with the annular top disk. In between the top disk and the annular uncut bottom or "loading" disk there is placed a slit-slot annular disk member that can be aligned so that the center of the petals of the slit-slot annular disk member are aligned with the sharp edges of the annular top disk so that the sharp edges of the annular top disk cannot mechanically damage the uncut bottom or loading disk.

A tensile load carrying strap member extends from the central uncut portion of the top section to the periphery thereof, for securing the center of the disk top section to one of the petals of the top disk after the disk ruptures so that the disk central portion is not lost in the flow stream that passes through the ruptured disk.

In the preferred embodiment, the securing strap is a tensile load carrying metal strap attached at its respective end portions to the top disk central uncut portion and to the disk periphery.

In the preferred embodiment, the plurality of slits or cuts in the annular top disk each terminate at a generally circular opening, the plurality of openings associated with the plurality of slits defining the periphery of the uncut central portion of the top disk section.

In the preferred embodiment, the top disk is metal. In one embodiment, the uncut "loading" or bottom disk is of a metal material. In another version, the uncut "loading" bottom disk is of a plastic material.

In the preferred embodiment, the slit-slot annular disk is a plastic disk member. In the preferred embodiment, the securing strap is a metallic strap that is spot welded at its end portions respectively to the top disk section at the central uncut portion thereof, and at its opposite end portion to the top disk section periphery.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 1:
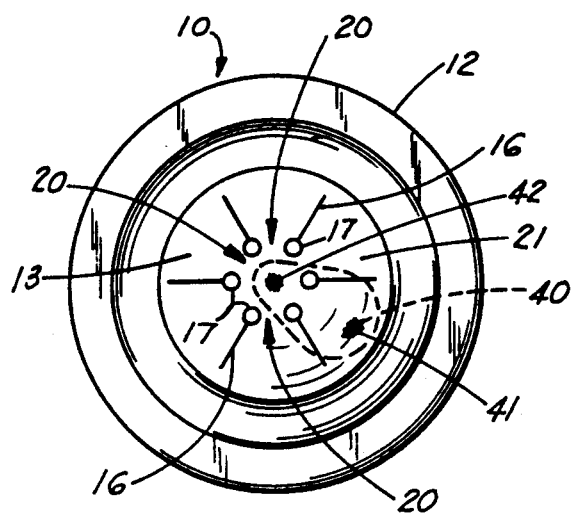
FIG. 1 is a top view of the preferred embodiment of the apparatus of the present invention.
Figure 2:
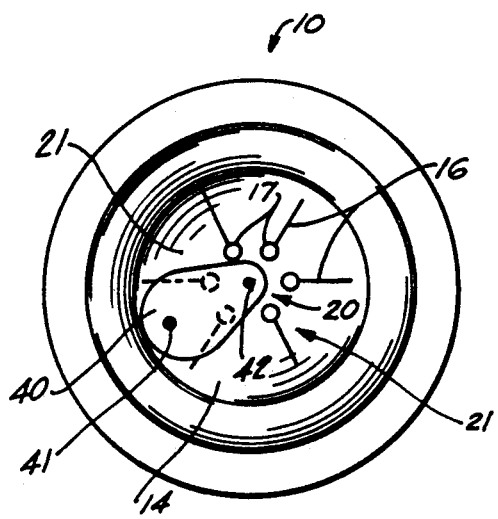
FIG. 2 is a bottom view of the preferred embodiment of the apparatus of the present invention.
Figure 3:
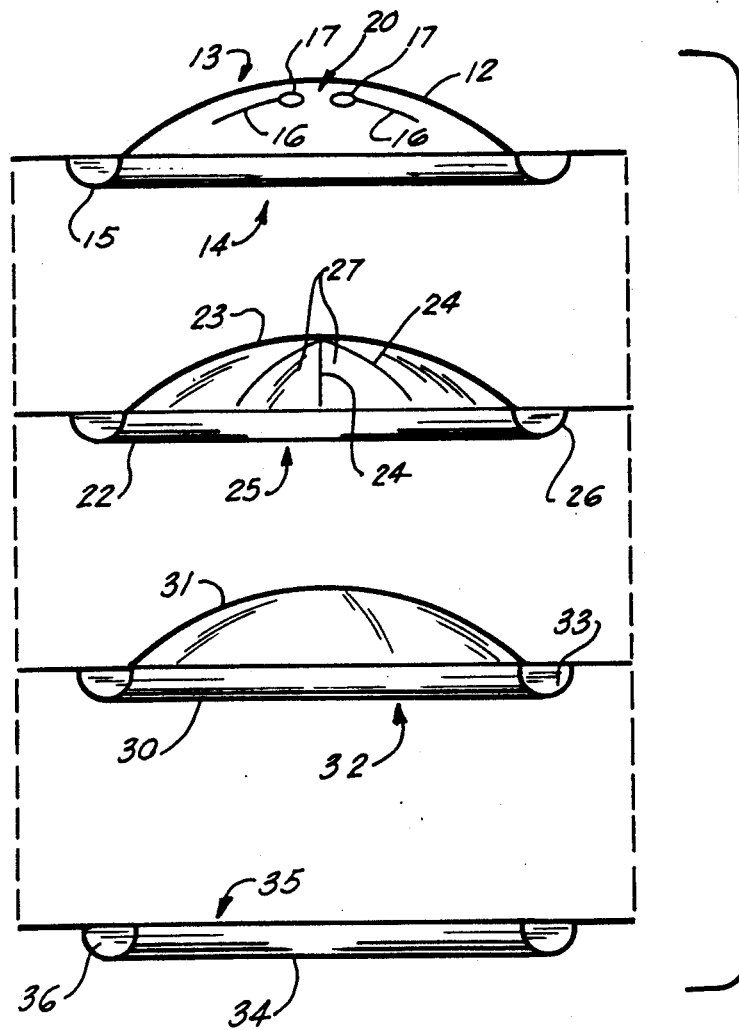
FIG. 3 is an exploded elevational view of the preferred embodiment of the present invention.

FIGS. 1-3 illustrate the preferred embodiment of the apparatus of the present invention designated generally by the numeral 10. Top disk section 12 is the uppermost disk of the composite disk 10 construction of the present invention. The top disk section 12 includes an upper 13 and a lower 14 surface and a disk peripheral flange 15 which can be U-shaped in radial cross section as is shown in FIG. 3. The top disk section 12 includes a plurality of radially spaced slits or cuts 16, each preferably terminating at an opening 17 that is generally circular. The plurality of circular opening 17 define the peripheral limits of a generally circular central uncut portion 20 of the top disk 12 as shown best in FIGS. 1, 2, and 3. The uncut portion 20 often breaks away during rupture.

Figure 4:
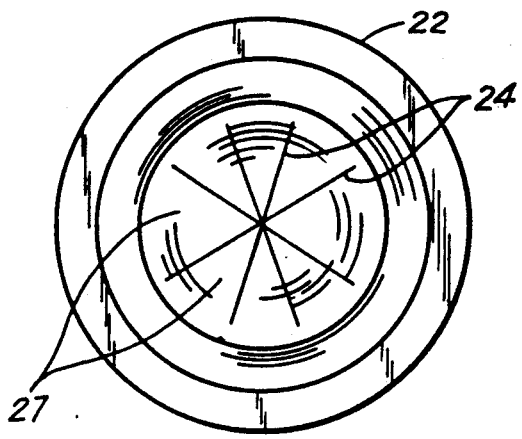
FIG. 4 is top view of the slit-slot support disk portion of the apparatus of the present invention.

Under the top disk section 20 is placed a slit-slot intermediate disk support member 22 of plastic for example, having a plurality of slits or cuts 24 which meet at the disk center as best seen in FIGS. 3 and 4. Because the cuts 24 meet at the center of the disk, a plurality of petals 27 are formed which can articulate independently of one another. Thus, slight variations in the movement of the overall composite disk 10 and of the top disk 12 are buffered by the plurality plastic petals 27 which align respectively with each of the cuts or slits 16 of the top disk 12. Thus, the sharp edges of each cut or slit 16 are aligned with the center of each pie shaped petal 27. In this manner, the articulating petals 27 receive any mechanical abrasion or cutting from the slits 16 rather than such mechanical cutting and/or abrasion being transferred to the loading disk 30. The slit-slot disk 22 includes a top 23 which is convex and a concave bottom 25. The disk member 22 can have a generally U-shaped peripheral flange 26 which corresponds in shape and size with the flange 15 of top disk 12.

The loading disk 30 is sized correspondingly and shaped correspondingly with the top disk 12 and with the slit-slot intermediate disk 22. The loading disk 30 thus has a top 31 surface which is convex, a bottom 32 surface which is concave and a generally U-shaped section at its periphery.

Underlying support flange 34 can be annular, and of a substantial structural material such as stainless steel or the like. The support 34 has a central flow opening 35 and a peripheral flange 36 which is U-shaped in section as shown in FIG. 3. Support 34 and top disk 12 can be welded together at their respective peripheries with disks 22 and 30 therebetween, stacked as shown in FIG. 1.

Figure 5:
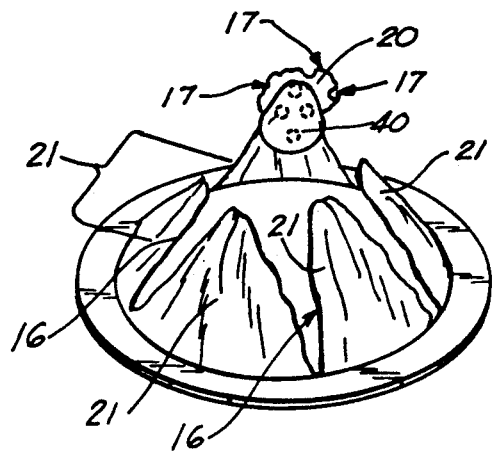
FIG. 5 is a perspective view of the apparatus of the present invention illustrating the rupture disk body in an exploded burst condition.
Figure 6:
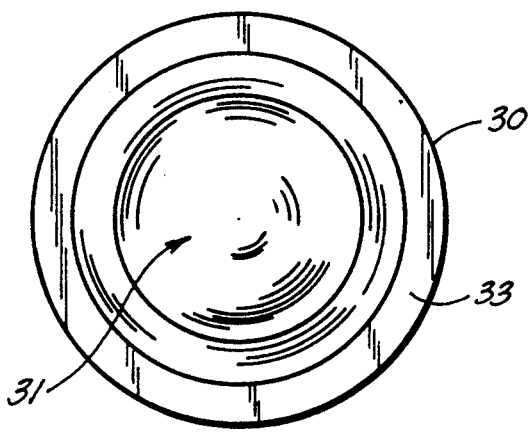
FIG. 6 is a top view of the loading disk portion of the apparatus of the present invention.
Figure 7:
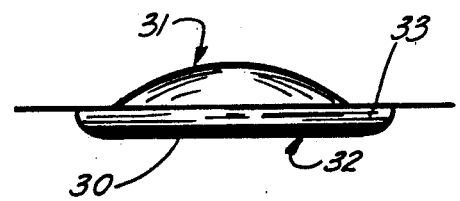
FIG. 7 is a side elevational view of the loading disk portion of the preferred embodiment of the apparatus of the present invention.
Figure 8:
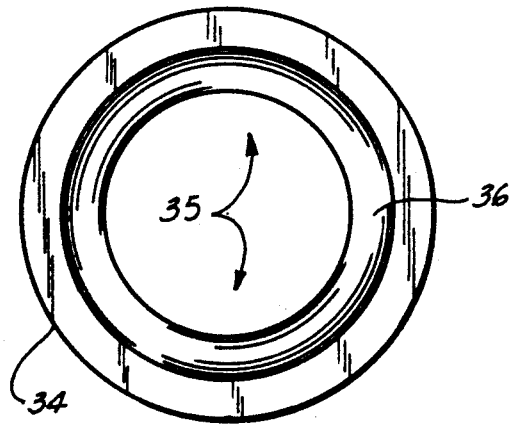
FIG. 8 is a top view of the annular support ring portion of the apparatus of the present invention.
Figure 9:
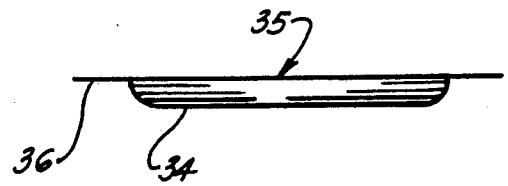
FIG. 9 is a side elevational view of the loading ring portion of the preferred embodiment of the apparatus of the present invention.

In FIG. 5, the top disk 12 is illustrated after rupture, with slits 16 opening to define the plurality of petals 21 which have separated and are clearly shown in a pie shaped configuration after bursting. The central 20 portion of the disk 12 has now been peripherally cut and is shown as surrounded by the plurality of circular openings 17 which were the end of each slit or cut 16 prior to bursting as shown in FIGS. 1, 2, and 3.

The central portion 20 has remained with one of the petals 21, being secured thereto by means of a tensile load carrying strap 40 having an attachment at 41 to the disk at its peripheral portion and a connection 42 to the disk central portion 20 as shown in FIGS. 1, 2 and 5. Thus, the tensile fastener 40 holds the central portion 20 of the disk to the remainder to the disk 12 after rupture occurs. In the preferred embodiment, the top disk 12 would be of a metallic construction such as stainless steel as would be the fastener strap 40.

The remaining disk components could be of thin stainless steel, or of a plastic construction. The intermediate slit-slot disk 22 and the loading disk 30, could be of a plastic material. The support flange 34 would typically be of a heavier material such as stainless steel or the like.

In view of the numerous modifications which could be made to the preferred embodiments disclosed herein without departing from the scope or spirit of the present invention, the details herein are to be interpreted as illustrative and not in a limiting sense.

What is claimed as invention is:

1. A composite rupture disk, comprising:
   a) an annular top disk section having a central portion and a plurality of circumferentially spaced, radial slits, each terminating a distance from the central portion, leaving a generally circular, uncut center having a size that determines at least in part, the burst pressure of the disk apparatus, the slits forming therebetween a plurality of disk petals with sharp edges that can separate upon rupture;
   b) an annular, uncut bottom disk seal member that can load the top disk section during use;
   c) a slit-slot annular disk member positioned between the top section and disk seal member forming a protective interface therebetween so that the sharp edges can not mechanically damage the uncut bottom disk seal member; and
   d) means defining a tensile load carrying member that increases the thickness of the disk along at least one petal and extending from the top section central portion to the top section periphery, for securing the center of the top section to one of the petals of the top disk after disk rupture so that the center is not lost in the flow stream passing through the ruptured disk.

2. The apparatus of claim 1 wherein the securing means is a tensile load carrying strap attached at is respective end portions to the top disk central portion and the top disk periphery.

3. The apparatus of claim 1 wherein each slit has a generally circular opening at one end portion thereof.

4. The apparatus of claim 1 wherein the top disk is metal.

5. The apparatus of claim 4 wherein the securing means is a metallic strap.

6. The apparatus of claim 5 wherein the securing means is a metallic strap welded at each end portion to the top disk section.

7. The apparatus of claim 1 wherein the uncut bottom disk is of a metal material.

8. The apparatus of claim 1 wherein the uncut bottom disk is of a plastic material.

9. The apparatus of claim 1 wherein the slit-slot annular disk seal member is plastic.

10. The apparatus of claim 1 wherein the slit-slot member has a plurality of circumferential radial slots that meet at a center of the slit slot disk member, forming a plurality of separable petals therebetween.

* * * * *